June 20, 1933.   O. F. CARPENTER   1,915,215
CORNER BRACE FOR COOPS AND CRATES

Filed Oct. 22, 1929

INVENTOR.
Ose F. Carpenter,
BY
Geo. P. Kimmel
ATTORNEY.

Patented June 20, 1933

1,915,215

UNITED STATES PATENT OFFICE

OSE F. CARPENTER, OF BRIGHTWOOD, VIRGINIA

CORNER BRACE FOR COOPS AND CRATES

Original application filed November 27, 1928, Serial No. 322,216. Divided and this application filed October 22, 1929. Serial No. 401,466.

This invention relates to a corner brace designed primarily for use in connection with poultry coops and crates, but it is to be understood that a corner brace, in accordance with this invention may be employed in any connection for which it may be found applicable, and the invention has for its object to provide, in a manner as hereinafter set forth, a brace for not only reinforcing and protecting the corners of a coop or crate, but further acting as a means for securing the upper and lower sides and end members of the crate or coop together.

A further object of the invention is to provide, in a manner as hereinafter set forth, a corner brace formed from a unitary body and common to and overlapping the meeting ends of a side and an end member of a coop or crate to couple them together, as well as to reinforce and protect the corners of the coop or crate provided by such members.

Further objects of the invention are to provide, in a manner as hereinafter set forth, a corner brace for poultry coops or crates which is simple in its construction and arrangement, strong, durable, thoroughly efficient in its use, readily installed with respect to a coop or crate, and inexpensive to manufacture.

With the foregoing and other objects in view the invention consists of the novel construction, combination and arrangement of parts as hereinafter more specifically described, and illustrated in the accompanying drawing, wherein is shown an embodiment of the invention, but it is to be understood that changes, variations and modifications can be resorted to which fall within the scope of the claims hereunto appended.

In the drawing wherein like reference characters denote corresponding parts throughout the several views:—

Figure 1:
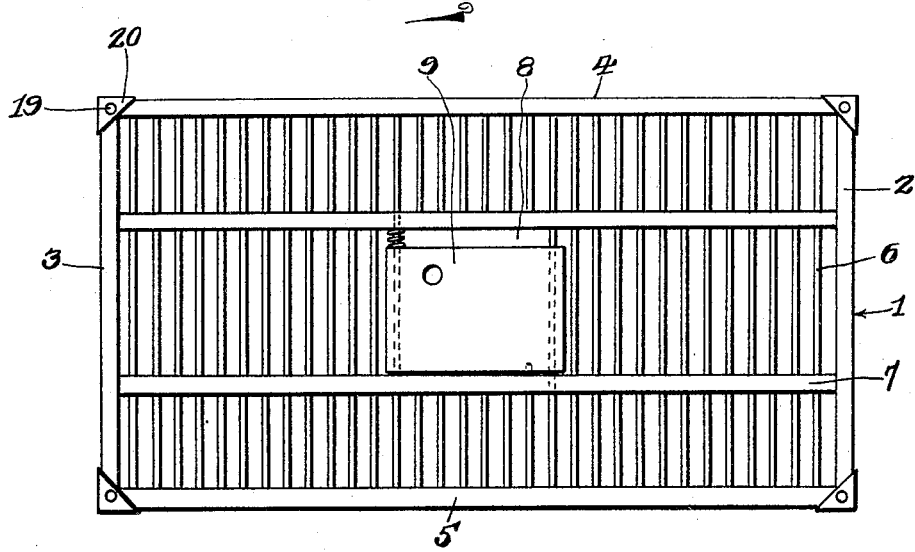
Figure 1 is a top plan view of a chicken coop showing the adaptation with the upper corners thereof of corner braces in accordance with this invention.

The corner brace forming the subject matter of this application is a division of my application Serial No. 322,216, filed November 27, 1928.

Referring to the drawing 1 generally indicates the top frame of a chicken coop and which includes the end bars 2, 3 and the side bars 4, 5. The top frame 1 in connection with the slats 6 and longitudinal brace bar 7 provides the top of the chicken coop, and such top has an entrance opening 8 closed by a spring controlled door 9.

Figure 2:
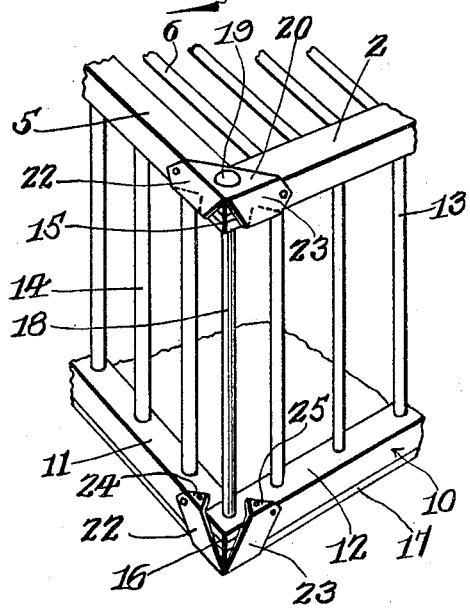
Figure 2 is a fragmentary view in perspective of a chicken coop showing the adaptation with the corners thereof of corner braces in accordance with this invention.

As is well known in constructions of chicken coops a bottom frame is employed and which is connected to the top frame by vertical slats arranged at the sides and ends of the coop body. Attached to the bottom frame is a bottom. Referring to Figure 2 the bottom frame is fragmentarily shown and is generally indicated at 10. The fragmentary portion of the bottom frame 10 includes a lower side bar 11 and a lower end bar 12. The end slats between the top and bottom frames are indicated at 13 and the side slats between the top and bottom frames are indicated at 14.

In Figure 2 the end bar and side bar 5 of the top frame 1 are illustrated. The bar 2 is connected to the bar 5 by a tongue and groove joint as indicated at 15. The side bar 11 and end bar 12 of frame 10 are connected together by a tongue and groove joint as indicated at 16. The bottom attached to the lower frame 10 is indicated at 17. It is to be understood that the bars 2 and 5 can be connected together at their ends in any suitable manner and this applies to the bars 11 and 12. The coop is shown as having attached to each corner thereof a vertically disposed metallic corner rod 18 which extends through the interengaging ends of the bars 2, 5 and the bars 11, 12. The interengaging ends of the bars 2, 5 and the bars 11, 12 are provided with openings for the passage of the rod 18. The rod 18 is to have each end thereof upset for anchoring it to the coop. The drawing illustrates the upper end of the rod 18 and such end is indicated at 19. The foregoing structural arrangement is illustrated so as to show the adaptation with the corners of a chicken coop of a corner brace in accordance with this invention.

Figure 3:
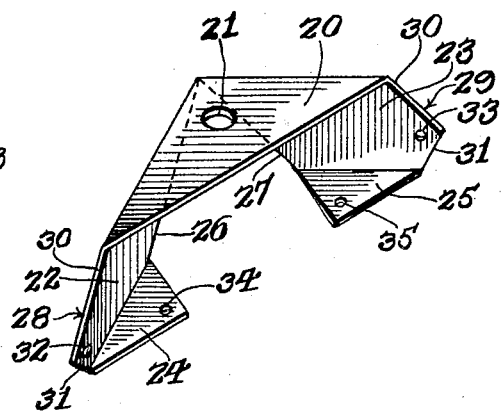
Figure 3 is a perspective view of the brace.

The corner brace which is clearly shown in Figure 3 is formed from a rectangular piece of sheet metal and comprises a flat body portion 20 of right angled triangular contour provided with an opening 21 for the passage of the rod 18. The brace further includes a pair of spaced arms 22, 23 which extend at an angle from the sides of smallest length of body portion 20 and each of said arms terminates in an inturned, triangular shaped flange. The flange which extends from the arm 22 is indicated at 24 and the flange which extends from the arm 23 is indicated at 25. The outer side edges of the arms 22, 23, indicated at 26, 27 respectively extend at opposite inclinations with respect to each other and further project away from each other. The inner side edges of the arms 22, 23 are indicated generally at 28, 29 respectively and each inner side edge has the portion 30 extend at an opposite inclination with respect to the portion 31 thereof, and by this arrangement the inner side of each arm is of tapered contour.

The arm 22 is formed with an aperture 32. The arm 23 is formed with an aperture 33. The flange 24 is provided with an aperture 34 and the flange 25 with an aperture 35. The arms 22, 23 incline in opposite directions with respect to and away from each other.

When the brace is mounted in position with respect to the bars 2, 5 the flanges 24, 25 are positioned against the lower faces of such bars. When the braces are positioned with respect to the bars 11, 12, the flanges 24, 25 are positioned upon the upper faces of such bars. The arms of the brace abut the outer side faces of the bars 2, 5 or the bars 11, 12 when the brace is mounted in position.

The apertures 32, 33, 34 and 35 are provided for the passage of holdfast devices to fixedly secure the brace to the bars 2, 5 or to the bars 11, 12.

When the brace is positioned at the corner of the coop or crate the body portion 20 is arranged upon the top of the bars 2, 5 or against the lower face of the bottom 17 of the coop or crate. The bottom 17 is not secured to the lower faces of the bars 11, 12, when the body portion 20 is positioned against the lower face of the bars 11, 12.

The fact that the corner rod 18 passes through opening 21 in body portion 20, it is anchored directly in the brace, as well as the interlocking end and side members of the crate, and there is provided a positive and substantial anchorage for rod 18 without allowing strain to come on the interlocking corner thereby eliminating damage to the latter.

It is thought the many advantages of a corner brace, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. A corner brace for the tops and bottoms of coops and the like comprising, a horizontal flat body portion of triangular contour for extending across and for seating against the outer face of the top or bottom of the coop at a corner of the latter, a pair of independent, spaced, oppositely inclined vertical arms extending from the sides of said body portion, disposed at right angles to each other and to said body portion, each of said arms of a length corresponding to the width of the outer edges of such corner, said arms abutting throughout thereof said edges, and a flange opposing in parallel spaced relation the inner face of said body portion, projecting inwardly at right angles to and integral with the outer end of each arm, for seating against the inner face of the top or bottom of the coop at such corner.

2. A corner brace for the tops and bottoms of coops and the like comprising, a horizontal flat body portion of triangular contour for extending across and for seating against the outer face of the top or bottom of the coop at a corner of the latter, a pair of independent, spaced, oppositely inclined vertical arms extending from the sides of said body portion, disposed at right angles to each other and to said body portion, each of said arms of a length corresponding to the width of the outer edges of such corner, said arms abutting throughout thereof said edges, and a flange opposing in parallel spaced relation the inner face of said body portion, projecting inwardly at right angles to and integral with the outer end of each arm for seating against the inner face of the top or bottom of the coop at such corner, the outer side edge of each arm formed of a pair of portions disposed at opposite inclinations and one of greater length than the other, the portion of smallest length being at the outer end of such side edge.

3. A corner brace for the tops and bottoms of coops and the like comprising, a horizontal flat body portion of triangular contour for extending across and for seating against the outer face of the top or bottom of the coop at a corner of the latter, a pair of independent, spaced, oppositely inclined vertical arms extending from the sides of said body portion, disposed at right angles to each other and to said body portion, each of said arms of a length corresponding to the width of the outer edges of such corner, said arms abutting throughout thereof said edges, a flange opposing in parallel spaced relation the inner face of said body portion, projecting inwardly at right angles to and integral with the outer end of each arm for seating against the inner face of the top or bottom of the coop at such corner, said body portion formed with an opening for the passage of a corner rod of the coop, said flanges provided with openings for the passage of holdfast means to anchor the flanges in position, and said arms formed with openings for the passage of holdfast means to anchor the arms against said corner edges.

4. A corner brace for the tops and bottoms of coops and the like comprising, a horizontal flat body portion of triangular contour for extending across and for seating against the outer face of the top or bottom of the coop at a corner of the latter, a pair of independent, spaced, oppositely inclined vertical arms extending from the sides of said body portion, disposed at right angles to each other and to said body portion, each of said arms of a length corresponding to the width of the outer edges of such corner, said arms abutting throughout thereof said edges, a flange opposing in parallel spaced relation the inner face of said body portion, projecting inwardly at right angles to and integral with the outer end of each arm for seating against the inner face of the top or bottom of the coop at such corner, the outer side edge of each arm formed of a pair of portions disposed at opposite inclinations and one of greater length than the other, the portion of smallest length being at the outer end of such side edge, said body portion formed with an opening for the passage of a corner rod of the coop, said flanges provided with openings for the passage of holdfast means to anchor the flanges in position, and said arms formed with openings for the passage of holdfast means to anchor the arms against said corner edges.

In testimony whereof, I affix my signature hereto.

OSE F. CARPENTER.